Figure 1:
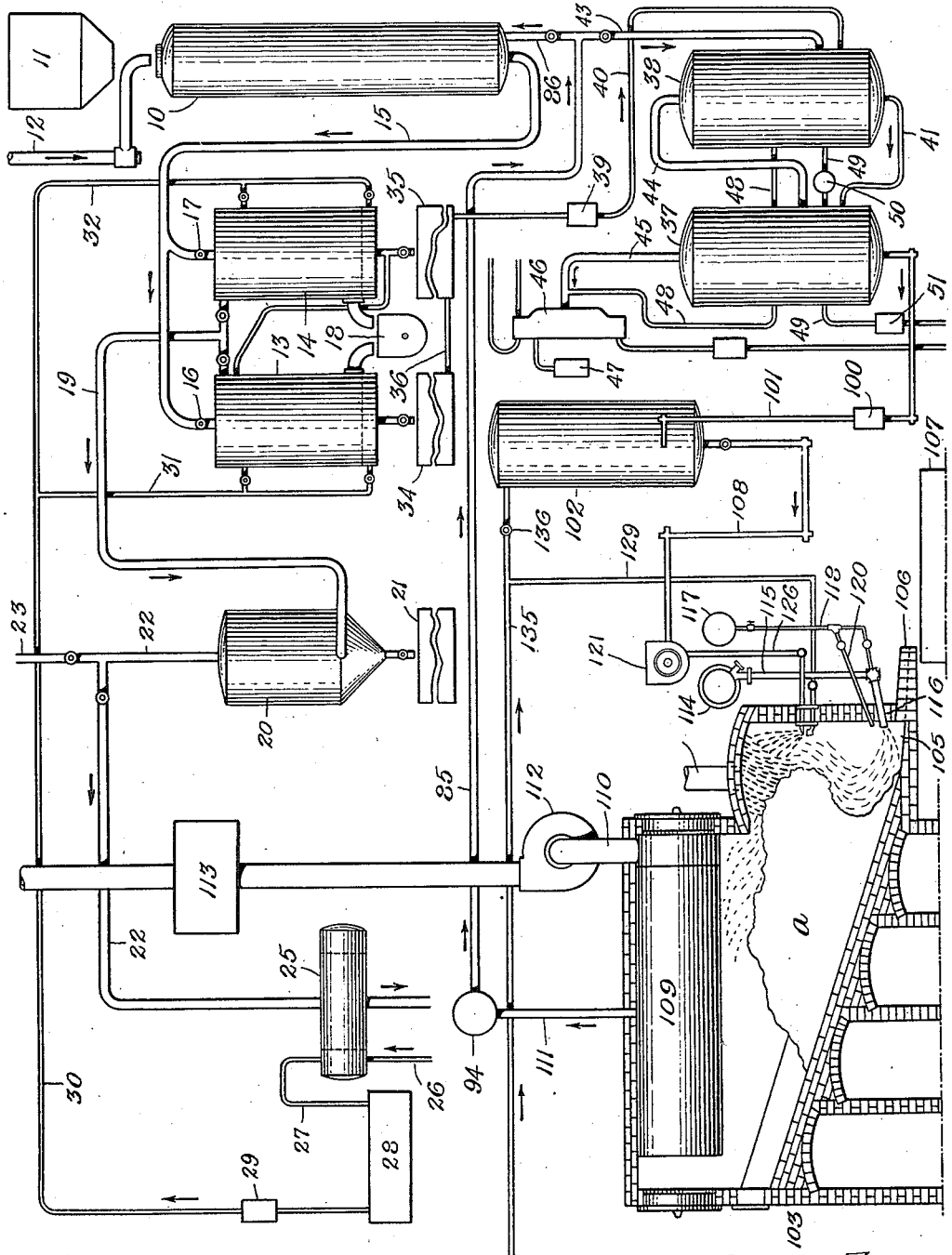

H. K. MOORE.
METHOD AND MEANS FOR TREATMENT OF WASTE LIQUORS.
APPLICATION FILED AUG. 14, 1913.

1,137,780. Patented May 4, 1915.
3 SHEETS—SHEET 1.

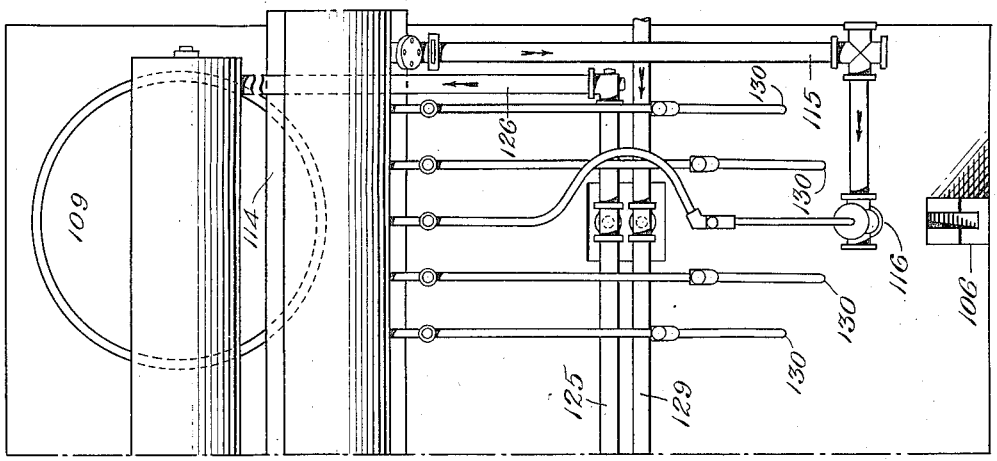
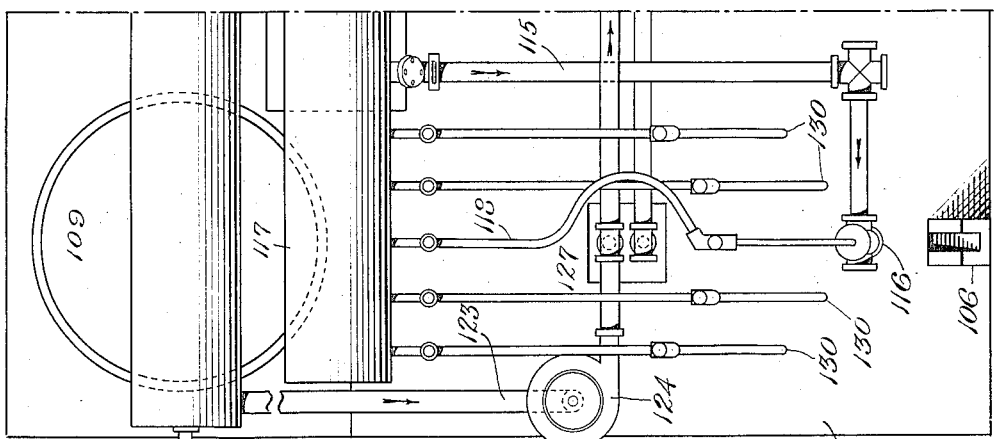
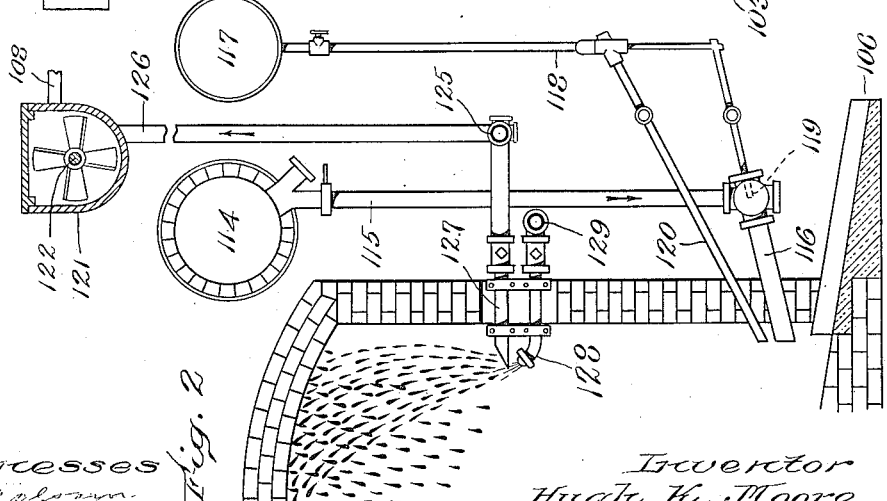

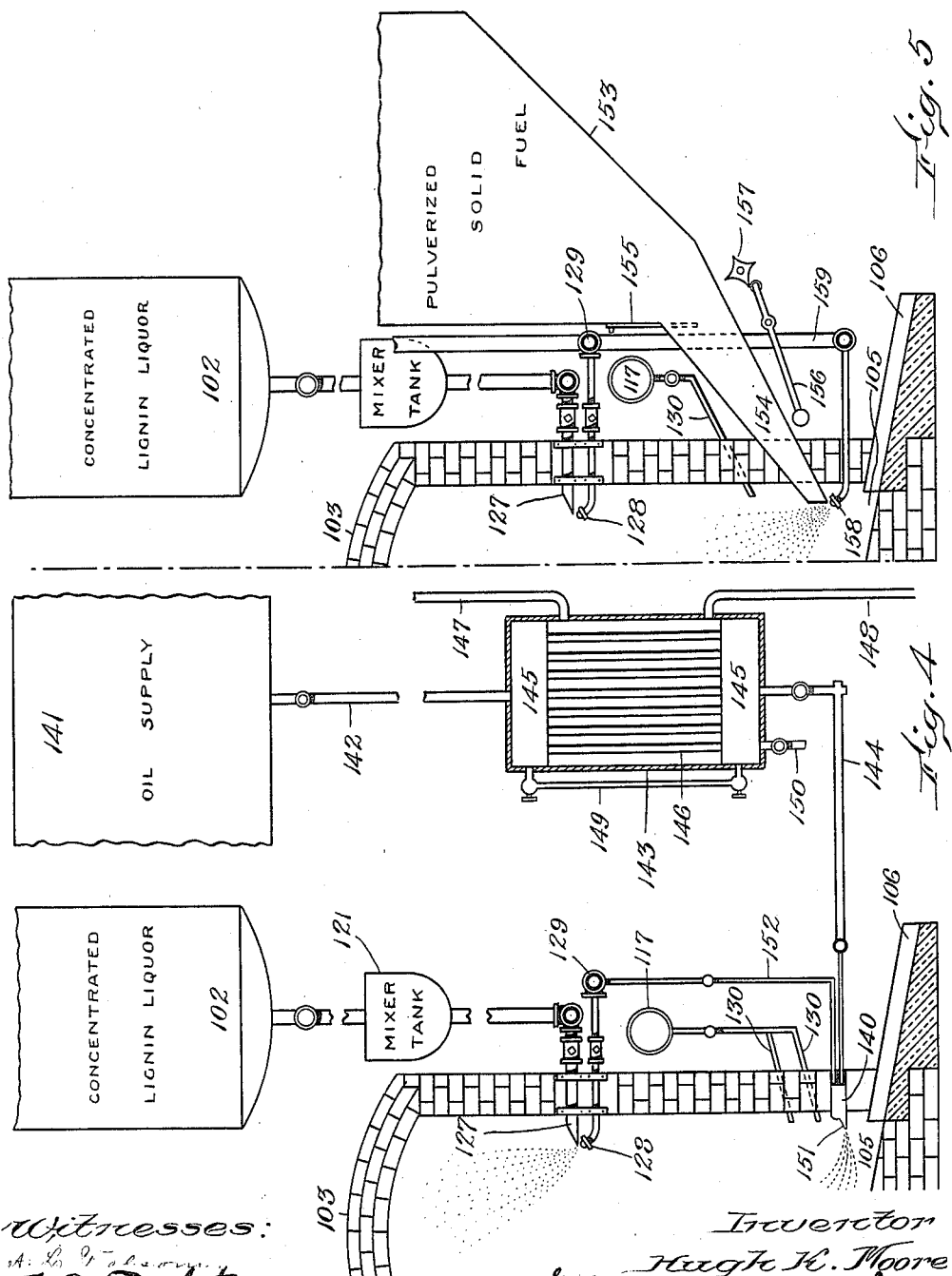

UNITED STATES PATENT OFFICE.

HUGH K. MOORE, OF BERLIN, NEW HAMPSHIRE.

METHOD AND MEANS FOR TREATMENT OF WASTE LIQUORS.

1,137,780.   Specification of Letters Patent.   Patented May 4, 1915.

Application filed August 14, 1913. Serial No. 784,801.

*To all whom it may concern:*

Be it known that I, HUGH K. MOORE, a citizen of the United States, and a resident of Berlin, in the county of Coos and State of New Hampshire, have invented certain new and useful Improvements in Method and Means for Treatment of Waste Liquors, (Case A,) of which the following is a specification.

The primary object of this invention is to secure a marked economy in the manufacture of wood pulp by an inexpensive recovery of the mineral or inorganic content of the liquor employed in the digestion of the raw material.

In the manufacture of sulfate pulp, as in the manufacture of soda pulp, the processes which are being followed practically in an attempt to recover the soda are expensive and dangerous. In these cases, the lignin or black liquor is evaporated by disk evaporators, and is delivered to rotary incinerators, where the partially evaporated liquor is still further evaporated and also charred, and from which it is delivered as "black ash" so-called. Sodium sulfate is mixed with the black ash to replace losses and the mixture is burned in a smelting furnace, the products of combustion of which are carried through the incinerator and the disk evaporator. This process is expensive, requiring a large number of operatives, and is dangerous, as is well recognized.

According to the present invention, I dispense with direct heat evaporators and incinerators, and provide a process for recovering the inorganic materials rich in sodium sulfid inexpensively and with safety to the operators.

Again another object of the invention is the practical utilization of the waste liquor in generating steam so that the large consumption of coal heretofore necessary to furnish steam for the mill may be reduced to a minimum. For instance, the black liquor from a sulfate digester contains approximately 6,000 B. T. U. per pound of solid matter, and it is the object of the present invention to use this heat in generating steam for performing the work of the mill or plant.

A further object of the invention is the high reduction of sulfate of soda to sodium sulfid used in compensating for losses in the process of manufacture of the pulp.

I shall explain the invention as carried out in the manufacture of sulfate pulp for the recovery of the soda, but it should be understood at the outset that the invention may be practised for the recovery of the inorganic content, *i. e.* lime and magnesia, from the lignin or waste liquor obtained in making sulfite fiber, or sodium carbonate from the waste liquor obtained in making soda pulp. The invention may be also utilized in recovering other inorganic materials from waste liquors in other arts.

According to my invention, the waste material is sprayed in the presence of intense radiant heat, so that while in transit, if liquid, the aqueous or volatile portion thereof is evaporated and the residuum so dried that it may be burned. Preferably the aqueous liquor is first partially evaporated and concentrated by steam heated evaporators and condensers, to a consistency resembling treacle and containing from 50% to 65% of solid matter, and be broken up by a powerful blast of suitable fluid into a spray suitable for the purpose.

The radiant heat may be obtained in various ways, as for instance by the incomplete combustion of a fuel in that portion of the retort through which the spray is passing. As a fuel, I may use gas, oil, or powdered or pulverized coal or coke, which is atomized or insufflated by a blast of fluid traveling at high velocity into the retort to produce a radiant flame. The spray of lignin liquor is in transit a very short time, say one-tenth ($\frac{1}{10}$) of a second, and the vaporization of the aqueous matter and the charring of the lignin matter should take place, while the liquor is in transit. It is for this reason that the radiant heat is desired, because the sensible heat of the gaseous products of combustion, with which the particles of liquor come in contact, is insufficient, and the time too short for their evaporation. Radiant heat delivered from a body is as the fourth power of the absolute temperature of the body. Hence anything which tends to diminish slightly the temperature of the radiant particle will very greatly reduce the radiant heat. Consequently, in delivering the fuel and in atomizing the liquor, I preferably employ a blast of air, rather than steam or gas, because the specific heats of steam and other gases are greater than that of air. Furthermore, it will be seen that the liquor should be primarily evaporated and concentrated as far as it is practical to handle it, before it is subjected to the radiant heat. Producer gas, made from coal, is the best fuel which I have thus far used for producing the necessary radiant heat, inasmuch as it contains an appreciable quantity of the illuminants,—ethylene, propylene, etc., as well as large quantities of carbon monoxid. In actual practice, I find that the radiant heat is further increased by burning flakes of black liquor residuum which are constantly dropping from the arch of the retort or furnace, and are destructively distilled, producing large quantities of illuminants. The spray falls as a partially charred residuum upon the floor and accumulates in a pile which gradually builds up. Oxygen is furnished for the combustion of the carbonaceous matter, and the inorganic content is smelted, reduced and discharged from the retort, rich in sodium sulfid.

The retort, in which the liquor is sprayed and burned, is lined or walled preferably with magnesia brick which is capable of a high degree of incandescence, and resists the action of the alkaline vapors of the inorganic content. Preferably this retort forms the firebox of a steam boiler furnace, and the products of combustion of the fuel and of the carbonaceous residuum are utilized to heat water for the generation of steam. This steam may be used for concentrating the black liquor, for cooking the raw material and performing other work in the operation of the plant.

In carrying out my process in connection with the recovery of soda from sulfate liquor, I may mix the sodium sulfate with the residuum in the retort and reduce the sulfate to sulfid therein, but preferably I mix the sulfate in a finely powdered condition with the concentrated liquor prior to its injection into the retort. By so doing, I secure a more complete reduction of the sulfate, and almost entirely prevent sublimation, inasmuch as the sulfate is completely distributed in the carbonaceous residuum and is supplied with the carbon for its reduction to the sulfid. As will be subsequently explained, the air, which is supplied for the combustion of the carbonaceous residuum, is prevented from reaching the smelted inorganic materials flowing from the accumulated mass of residuum.

In addition to the foregoing features, my invention comprises various other features which will be explained in detail in the following specification and pointed out in the claims thereto appended.

On the drawings,—Figure 1 illustrates conventionally and diagrammatically a portion of the apparatus which may be employed in making sulfate pulp, and in practising my invention. Fig. 2 illustrates a section through one of the retorts and illustrates some of the nozzles which project thereinto. Fig. 3 represents in front elevation a portion of a bank of furnaces and shows the containers and conduits for the air, the fuel and the concentrated lignin liquor. Fig. 4 shows an arrangement of instrumentalities in which the radiant heat is obtained by the combustion of oil as fuel. Fig. 5 shows the retort as being equipped for the combustion of solid carbonaceous matter for the generation of radiant heat.

I will briefly describe my invention as it may be carried out in connection with the manufacture of sulfate pulp, but, as previously explained, the invention may be practised in recovering other inorganic materials in other industries.

In said drawings,—10 indicates a digester to which chipped wood is fed from a receptacle 11 and to which the alkaline cooking liquor (which may contain sodium hydroxid, sodium sulfate, sodium carbonate and sodium sulfid, or one or more of them) is supplied by a conduit 12. After the digester has been charged and closed, the contents thereof are cooked for the proper length of time at the proper heat. After the cooking has been completed, the contents of the digester are discharged into one or the other of the wash or settling tanks 13, 14 through the conduit 15 having branches with valves 16, 17. These wash or settling tanks have the usual false bottoms and are provided with spouts from which the pulp is discharged into a conveyer 18 for further treatment. Steam, and pulp carried thereby, from the tanks are conducted by a conduit 19 to a pulp collector 20 from which the pulp is discharged into a receptacle 21, and the steam is conducted through conduits 22, to a surface condenser 25 by which water for washing the tanks 13 and 14 is heated. The conduit 22 has a stack 23 by which the steam may be discharged into the atmosphere if desired. The washing water is supplied to the condenser 25 by a supply pipe 26 and is conducted therefrom by a pipe 27 to a tank 28 from which it may be pumped by a pump 29 through a pipe 30, and the valved branches 31, 32 to the wash tanks 13 and 14. It will be understood that there may be as many wash tanks as desired although but two are shown.

The lignin or black liquor, which also contains the inorganic matter to be recovered, is discharged from the tanks 13 and 14 to the tanks 34, 35 connected by a conduit 36. From these tanks the black liquor is forced by a pump 39 through a conduit 40 to steam-operated condensers and evaporators indicated at 38 and 37. But two effects are shown, although in practice I prefer five or six arranged in series. By means of these combined condensers and evaporators, the black liquor is preferably concentrated and evaporated to approximately 35° Bé., at which consistency it contains approximately 50% to 65% solid matter and is of about the consistency of treacle. From the last effect 37, the partially concentrated and evaporated black liquor is forced by a pump 100 through a conduit 101 to a closed storage tank 102.

94 indicates a main steam trunk from which a branch pipe 85 delivers steam through the valved branch 86 to the digester, and through a valved branch 43 to the first effect 38. I have illustrated conventionally a conduit 44 for the steam arising in the first evaporator to conduct it to the condensing chamber of the second effect. Steam from the evaporator chamber of the second effect passes through conduit 45 to a condenser 46 with which is connected a vacuum pump 47.

48, 48 indicate air-relief pipes, and 49, 49 indicate pipes for the water of condensation in the condensing chambers of the two effects, the latter pipes having connected therewith a trap 50 and the pump 51, respectively. For conducting the liquor from one effect to the other, there is a pipe 41.

It should be understood that the drawing does not attempt to indicate the relative positions and levels of the various instrumentalities which I have thus briefly described, nor their relative dimensions. The drawing is sufficient, however, to indicate to persons skilled in the art the various instrumentalities which are employed.

I have shown at 103 combined smelting and steam-boiler furnaces, each having a large fire-box or retort lined with magnesia brick capable of high incandescense, the bottom of which is transversely concave and which slopes downwardly from the back wall to the well 105 from which the molten inorganic content may be discharged through a spout 106 to a receiving and dissolving tank 107 containing water. Above the retort is any form of boiler that it may be desired to employ. I have shown conventionally a boiler shell 109 which may have the usual tubes or flues (not shown) through which the products of combustion pass from the retort to a stack 110. The steam, which is generated in the boiler, passes through a pipe 111 to the trunk 94 and may be utilized in carrying on the work of the mill, such, for instance, as cooking the chipped wood in the digester and initially evaporating and concentrating the black liquor, etc., as previously stated. Preferably there is placed in the stack 110 an exhaust fan 112 and a washer 113 for the stack gases. A washer of any suitable character may be employed for this purpose, and consequently I have shown it in the most conventional manner. There are at the present time on the market various washers which may be utilized. Such a washer is desirable since in operation certain small amounts of sulfate, sulphide and carbonate of soda are apt to be sublimed in the process and are carried through the boiler and fan, and would be lost if they were not collected and recovered by some such means. These substances after recovery are utilized in the production of the liquor for digesting the wood. They may be caused to pass directly from the washer into the dissolving tank 107 if desired.

In the retort or fire-box, I generate an intense radiant heat. This may be done in various ways, and I do not limit myself, broadly speaking, to any specific means for accomplishing it. For instance, the walls of the retort could be made hollow, and heated from the interior electrically or by combustion, in which case there would be no radiant flame in the retort except, perhaps, that formed by the combustion of the liquor, although there would be intense radiant heat therein. In the embodiment shown, I employ a combustible which is burned in the retort to produce a radiant flame. Any suitable combustible, such as oil, gas, powdered coal or coke, may be utilized, although my preference is for producer gas, such as generated in a Chapman rotary gas producer because of the comparatively large proportion of carbon monoxid therein. I have not illustrated the producer, as it is well known.

The supply of producer gas is drawn from a conduit 114 in which it is preferably under 1 to 2 inches water pressure. It passes through pipes 115 to downwardly inclined nozzles 116, passing through the front walls of the retorts and located above the spouts. The inclination of each nozzle is such that the gas is directed downwardly toward the front and bottom part of the accumulation of residuum in the retort to provide a reducing atmosphere for the sulfate. At 117 I have shown an air conduit to which air is delivered by a positive blower (not shown) at low pressure, say one to two pounds per square inch above atmospheric. From this conduit, a pipe 118 extends to the nozzle 116 and is equipped with a small ejector nozzle 119 to deliver air to be mixed with the gas so that the partial combustion of the gas will take place close to the end of the nozzle 116. From the pipe 118, leads a branch 120 extending through the front wall of the retort and terminating in a downwardly inclined nozzle above the gas nozzle, so as to direct the gas and flame downwardly toward the molten soda and the bottom portion of the pile of residuum or the bottom of the retort. The air supplied by the nozzles 119, 120 is not sufficient for the complete combustion of the gas,—this for three reasons:—namely, in order that a radiant flame may be obtained, in order that oxygen may not reach the molten inorganic content flowing to the spout so as to oxidize the sulfid, and in order that the gas may be brought into contact with any molten sulfate to reduce it to the sulfid with an exothermic reaction or a slightly endothermic reaction, as follows:

$$Na_2SO_4 + 4CO = Na_2S + 4CO_2 \text{ (exothermic).}$$
$$Na_2SO_4 + 8H = Na_2S + 4H_2O \text{ (slightly endothermic).}$$

In this connection, I may say that, in the accumulated residium, the carbon reduces the sulfate to sulfid as follows:

$$Na_2SO_4 + 2C = Na_2S + 2CO_2.$$
$$Na_2SO_4 + 4C = Na_2S + 4CO.$$

Undoubtedly a part of this sulfid is oxidized back to sulfate, but, before it is discharged, it is reduced again by the gas according to the reactions first given.

The partially evaporated or concentrated black liquor, which is pumped to the tank 102, is delivered therefrom under pressure to a mixer 121 located above and in front of the bank of furnaces, and with it is mixed finely divided sodium sulfate to supply the loss occasioned in the manufacture of the pulp. This mixer is shown as comprising an elongated tank through which extends a driven shaft 122 having agitator or mixer blades thereon for thoroughly commingling the liquor and the sulfate. The mixture delivered from one end of the tank by a pipe 123 is forced by a pump 124 through a pipe 125 in front of the retorts, and such of the liquor as is not used is returned to the tank by a pipe 126. This liquor is carried through the pipe in large excess of that needed, so that its velocity will prevent settling of the sulfate. From the pipe 125, nozzles 127 extend into the retorts near the upper portions thereof so as to deliver small streams of the black liquor thereto. These nozzles may be made in any suitable way, preferably so that they may be cleaned out from time to time as needed.

I have arranged below each liquor nozzle in a retort, a nozzle 128 for delivering a powerful blast of a gaseous medium in such way as to strike the stream of black liquor and break it up into a fine spray. This spray should be as finely divided as possible to secure the greatest surface and least volume of the particles of liquor. Any suitable nozzle may be used, but I have shown one in which the air is delivered through an elongated slit of minute width.

Though steam or gas might be used (though not so effectively), I prefer to employ air for atomizing or spraying the liquor. It is delivered to the nozzles 128 at great velocity and high pressure, say over 2,000 feet per second, at a pressure of 100 pounds per square inch from a pipe 129 leading from a suitable source of supply. The nozzles 128 are upwardly inclined so that the spray of liquor is directed upwardly and rearwardly through the intense radiant heat toward the arch of the retort and rearwardly toward the sloping floor of the furnace. While it is in transit, the concentrated liquor is evaporated and more or less charred, and reaches the floor and accumulates in a pile $a$ in condition for combustion. More or less of the liquor coats the arch and prevents its disintegration. Droppings or flakes of the charred residuum from the arch drop into the front of the fire and increase the illuminants, thereby increasing the radiant heat.

Oxygen must be supplied for the combustion of the charred residuum, and for this purpose I employ a plurality of twyers 130 projecting into each retort. These twyers or nozzles are above the burner indicated in Fig. 3, and direct jets of air into the front portion of the accumulation of residuum in the retort. Air is supplied to these twyers from the conduit 117, under a low pressure, say 1 pound to the square inch. The jets of air dig into the pile $a$, and the top heavy portion of the pile slumps forward from time to time so that spongelike masses of the carbonaceous material are being constantly blown upwardly, and the front portion of the pile is being agitated and burned. The alkaline vapors, condensing on the boiler, drop downwardly in the rear portion of the retort in the form of white hot liquor and flow forwardly through the pile, tending to work the whole mass forward. In case a large mass slumps forward to close the gas and air nozzles, it is forced backward by injecting air under great pressure.

The products of combustion, resulting from the burning fuel and from the burning residuum, pass through the boiler, and generate steam therein. Such inorganic substances as are carried into the stack are removed by the washer and returned by means (not shown) to the dissolving tanks.

The smelted soda flows from the spouts leading from the retorts into dissolving tanks containing water. The sodium carbonate passes into solution without change, whereas the sulfid breaks up as follows:

$$Na_2S + H_2O = NaHS + NaOH.$$

It will be understood that the various pipes and conduits will be provided with the necessary valves, cocks, clean-outs and the like, which I have not attempted to describe in detail and some of which are shown in conventional form. I have shown the various nozzles or twyers conventionally, and of course any may be used which are suitable for the purpose.

I have shown but two combined smelting and boiler furnaces and only a portion of the pulp-making instrumentalities, but it will be understood that as many furnaces, digesters, wash tanks, etc., may be employed as will be necessary to produce the desired output of pulp. Preferably I employ, in addition to the combined smelting and boiler furnace, an ordinary boiler furnace to take care of the ordinary "go and come" of the plant. The process of course is continuous, the various digesters furnishing the liquor in quantities to maintain a continuous operation of the condensers and evaporators. The combustion of the residuum in the retorts furnishes in part, at least, the steam for concentrating another portion of the liquor, and the recovered soda is used for digesting a fresh supply of raw material.

I have stated herein that in treating sulfate liquor, preferably the sulfate is mixed with the concentrated liquor prior to its being sprayed into the retort, but, if desired, the sulfate may be fed into the retort through an opening in the arch of the retort. A balanced draft in the retort is maintained to prevent the escape of fumes or gases through the front portion thereof and the entrance of air into the furnace.

In Fig. 4, I have shown the retort as being provided with burners 140 for the combustion of a liquid fuel which is preferably a hydrocarbon such as crude petroleum. At 141 I have shown a closed tank for containing the liquid fuel and upon which pressure may be exerted by an air pipe (not shown) entering the top of the tank so as to maintain a static pressure of two or more pounds upon the oil in the tank. From the bottom of the tank, the oil passes through a valved pipe 142 to a heater 143 and thence through a valved pipe 144 to the burner 140. The oil is preferably heated in the heater to a temperature below the flash point, although if desired the oil could be vaporized in the heater. The heater itself may be of any suitable construction. As shown, the drums 145 are connected by tubes 146, the whole being inclosed in a shell or casing. Steam from the pipe 147 enters the space through which the tubes extend and is discharged at 148. The heater has a gage 149 so that the presence of water in the oil may be determined. Such water as separates may be blown out through a valved discharge pipe 150.

It will be understood that the oil burner may be of any approved construction, there being various burners upon the market which are suitable for the purpose. Preferably it consists of a bronze casting having a duct to which the pipe 144 is connected. The oil, which reaches the lip 151 which is preferably serrated, is blown therefrom by a powerful air blast emerging from a duct in the burner, to which duct there is connected a valved pipe 152 from the high pressure pipe 129. The air is emitted from the duct in the burner at a velocity of something over 2,000 feet per second. The burner is close to the floor of the furnace so that the oil is directed toward the flowing molten soda and impinges thereon to supply carbon and hydrogen for the reduction of sodium sulfate.

In Fig. 5, I have shown the retort as being provided with means for supplying for combustion therein finely powdered solid carbonaceous matter which is blown into the retort by a blast of air under high pressure and burned. I have not shown the various instrumentalities which are utilized in pulverizing this carbonaceous matter, as various forms of apparatus for this purpose may be utilized. Assuming that coal or coke is used as the fuel, the various crushers which are used for preliminary crushing or breaking rock or coal may be employed. The coal or coke, however, is preferably subjected to further pulverizing and crushing processes until it is reduced to a condition in which the greater percentage of it will pass through a 200 mesh sieve, that is a sieve having 40,000 holes to the square inch. When it has been crushed to this condition, the coal or coke does not feel gritty when placed between the teeth. After being properly crushed and pulverized and reduced to powder, the coal or other carbonaceous matter is placed in a hopper 153 from which it is delivered to the retort near the floor thereof above the spout 106 from which the molten effluent flows. Any suitable sort of feeding apparatus may be employed. I have shown the hopper 153 as having a converging spout 154 extending through the front wall of the retort and from the lower wall of which spout the carbonaceous matter is delivered in a stream. The flow of this material is regulated by a movable gate 155, and, in order to insure a continuous flow, the spout is tapped rapidly by a tapper 156 oscillated by any suitable mechanism such as a rotating star wheel indicated at 157. The carbonaceous material, in its finely divided and pulverized condition, is highly inflammable, and, as it emerges from the spout, it is met by a powerful blast of air traveling at a velocity of something over 2,000 feet per second. This air is discharged from the nozzle 158 arranged below the spout. On the ignition of the material, a flame resulting from incomplete combustion and containing a quantity of illuminants is obtained, with the generation of an intense radiant heat. Air is supplied to the nozzle 158 by a pipe 159 leading from the high pressure air pipe 129.

To anyone familiar with the manufacture of wood pulp, it will now be apparent that the invention which I have herein disclosed provides advantages and economies of operation that make possible a great reduction in the cost of production of the pulp. First, I eliminate a great deal of manual labor; second, I reduce the coal consumption to the minimum; third, I secure a more perfect reduction of the sulfate; fourth, I save practically all the soda left in the waste liquor; and fifth, I eliminate, to a great extent, danger to the operatives and thereby reduce the cost of liability insurance. In addition, there are other advantages which will be appreciated by persons skilled in the art, but to which reference need not be specifically made.

Having described my invention, it will be apparent that it may be practised in various ways and that many changes may be made in the instrumentalities herein shown and described without departing from the spirit and scope of the invention. In lieu of employing a single burner for each retort, I have contemplated and used a plurality of burners and also oscillatory nozzles so that the flame and the spray may be directed from side to side into various portions of the fire-box. For convenience in cleaning, some portions of the conduits may be made of flexible piping so that the twyers, burners or nozzles may be easily withdrawn to inactive position.

Having thus explained the nature of my said invention and described a way of making and using the same, although without attempting to set forth all of the forms in which it may be made or all of the modes of its use, what I claim is:—

1. A process of treating lignin liquor which consists in partially concentrating the same, exposing a stream thereof to an air blast to form a continuous spray, and passing such spray through a radiant flame in a chamber heated to radiant heat for the evaporation or volatilization of the liquid, and then burning the residuum.

2. The herein described process of treating lingin liquor, which consists in burning a fuel in a retort to produce an intensely hot flame, spraying such liquor through said flame to evaporate liquid therefrom, forming an accumulation of the residuum in the retort, and supplying additional oxygen to and burning such residuum while in the retort.

3. The herein described process of treating lignin liquor, which consists in spraying the same with air into a retort and into a flame produced by burning a suitable fuel accumulating the residuum, supplying additional oxygen to burn the residuum, smelting the inorganic content of such residuum in a reducing atmosphere, and withdrawing the same in molten condition from the retort.

4. The herein described process which consists in producing a hot flame by incomplete combustion of a fuel in the lower part of a retort, spraying lignin liquor through said flame into the upper part of said retort to evaporate the liquid therefrom while in transit, accumulating the residuum on a sloping floor of the retort, and supplying air under pressure to the upper portion of said accumulated residuum to burn the same.

5. The herein described process which consists in mixing sulfuate lingin liquor and sodium sulfate, and spraying such mixture into a retort in the presence of radiant heat.

6. The herein described process which consists in mixing sulfate lignin liquor and sodium sulfate, spraying such mixture into a retort in the presence of radiant heat to evaporate the liquid, and burning the residuum and smelting the inorganic content.

7. The herein described process which consists in mixing sulfate lignin liquor and sodium sulfate, spraying such mixture into a retort in the presence of radiant heat to evaporate the liquid, and supplying a reducing agent for the sulfate.

8. The herein described process which consists in mixing sulfate lignin liquor and sodium sulfate, spraying said mixture into a retort, burning a combustible in said retort to evaporate the liquor, burning the residuum and smelting the inorganic content, and supplying a reducing agent adjacent the molten mineral content for reducing the sodium sulfate to sodium sulfid.

9. The herein described process which consists in burning the residuum of lignin liquor containing sodium sulfate, smelting the inorganic content thereof, and directing a reducing agent upon said smelting inorganic content while in a molten condition, to reduce the sulfate to sulfid.

10. A process of recovering soda from waste lignin liquor, which consists in producing a flame in a retort by the combustion of a suitable fuel, spraying said lignin liquor containing sodium sulfate into the retort in the presence of said flame to evaporate the water therein, burning the residuum, smelting the inorganic content of said residuum, creating a reducing atmosphere adjacent the molten content for the reduction of sodium sulfate to sodium sulfid, and continuously withdrawing the molten product.

11. A process of treating waste sodium-sulfate-containing liquors which consists in concentrating such liquor, spraying the same into the upper portion of a retort, creating a combustible reducing atmosphere in the lower portion of the retort for the reduction of molten sulfate of soda to sulfid of soda, and directing air into the retort for the combustion in the upper part of said retort of the combustible atmosphere and for the combustion of the residual deposit from said spray.

12. A process of treating waste sulfate liquor which consists in spraying the liquor in concentrated form into and burning it in a retort to smelt the contained mineral content, and creating a reducing atmosphere adjacent the molten mineral content to reduce the sodium sulfate to sodium sulfid, substantially as set forth.

13. A process of treating waste digester liquor which consists in concentrating such liquor, atomizing the same in a retort heated to radiant heat to further evaporate the water therein contained, accumulating a carbonized mass of the residiuum on the floor of such retort, introducing fuel into and incompletely consuming the same in the lower portion of said retort, and directing a stream of air into the retort for completing the combustion of said fuel, and burning said residuum and smelting the inorganic content thereof.

14. A process of treating waste digester liquor containing sodium sulfate, which consists in spraying such liquor into radiant heat in a retort to vaporize the water therein, accumulating the residuum in a pile, blowing a fuel into and incompletely consuming the same in the lower portion of the retort to form a reducing atmosphere therein, smelting the inorganic content of such residuum, reducing the molten sulfate to sulfid by the reducing atmosphere, and withdrawing the molten mineral content.

15. The combination of a retort having a floor which slopes from the back wall to the front, means for injecting and directing a spray of lignin liquor through the front wall of the retort, means for delivering fuel into the retort so that the spray passes through the flame produced by said fuel, and twyers for directing jets of air to furnish oxygen for the combustion of the lignin liquor residuum which accumulates on the sloping floor.

16. The combination of a retort having a floor which slopes from the back wall to the front, means for injecting and directing a spray of lignin liquor through the front wall of the retort inwardly and toward said floor, means for delivering and directing fluid fuel into the retort toward the floor thereof, twyers located between said means for directing jets of air toward the floor to furnish oxygen for the combustion of the lignin liquor residuum which accumulates on the sloping floor, and means at the front of the sloping floor for discharging the inorganic materials smelted by the combustion of said residuum.

17. The combination with a retort and means for burning a combustible fuel to produce radiant heat in said retort, of means for mixing waste liquor and sodium sulfate, means for spraying said mixture into said retort in the presence of the radiant heat, and means for supplying oxygen separately to said retort for burning the evaporated residuum of said liquor without contacting with the molten sulfate.

18. Means for recovering the mineral content of black liquor, comprising a smelting furnace, a gas burner near the floor of said furnace for supplying a reducing atmosphere, an atomizer at a higher level for spraying black liquor through the flame produced by the burning gas, and means at an intermediate level for supplying oxygen for the combustion of the accumulated residuum and the more complete combustion of said gas.

19. Means for treating waste digester liquors, comprising a retort lined with material adapted to be heated to radiant heat, means for injecting fuel into the lower portion of said retort, an atomizer for injecting a spray of such liquor into the upper portion of said retort, and an intermediate air nozzle for supplying air into said retort.

20. Means for treating waste digester liquors, comprising a retort having a sloping floor, an atomizer for spraying such liquor into the upper portion of said retort, a fuel burner at the lower portion of the retort and directed toward said sloping floor, means located between said burner and said atomizer for directing a stream of air into said retort, and an outlet for the molten mineral content of said liquor, substantially as described.

21. Means for treating waste digester liquors, comprising the combination of a combined boiler and smelting furnace having a retort with an outlet for the molten mineral content of such liquor, an atomizer for spraying concentrated liquor into the upper part of such retort, a fuel burner in the lower part of said retort, an intermediate nozzle for supplying air into said retort, a combined condenser and evaporator for the black liquor, means for conducting steam from the boiler to said condenser and evaporator, and means for conducting the concentrated liquor from the condenser and evaporator to said atomizer.

22. The combination of a combined boiler and smelting furnace, a digester, a conduit for supplying steam from the boiler to the digester, a separator for the pulp and black liquor, having a valved connection with the digester, a multiple-effect condenser and evaporator, a conduit for supplying steam to said evaporator and condenser, a conduit from said separator to said evaporator and condenser to supply black liquor thereto for evaporation, means for conducting evaporated liquor from the evaporator and condenser to the smelting furnace and spraying it thereinto, air conduits for spraying said liquor into said smelting furnace, air conduits for supplying oxygen for the combustion of the evaporated residuum of said liquor, and burners for injecting and burning fuel in said smelting furnace, substantially as set forth.

In testimony whereof I have affixed my signature in presence of two witnesses.

HUGH K. MOORE.

Witnesses:
MARCUS B. MAY,
A. L. FOLSOM.